United States Patent Office

3,734,812
Patented May 22, 1973

3,734,812
LAMINATE PRODUCT OF CROSSED STRETCHED TAPES HAVING PERFORATIONS FOR AIR PERMEATION AND METHOD FOR PREPARING THE SAME
Masahide Yazawa, Tokyo, Japan, assignor to Polymer Processing Research Institute Ltd., and Nippon Petrochemicals Co., Ltd., both of Tokyo, Japan
Filed Aug. 9, 1971, Ser. No. 169,990
Claims priority, application Japan, Aug. 25, 1970, 45/74,762
Int. Cl. B32b 5/12, 3/10, 31/26
U.S. Cl. 161—57                         3 Claims

ABSTRACT OF THE DISCLOSURE

A cross-laminated product of stretched tapes having perforations for air permeation is prepared by warping a large number of elongated uniaxially stretched tapes of narrow width prepared from a fiber forming polymer at predetermined distances from one to another, laminating the warped tapes as a warp tape layer and weft tape layer, so that the warp tapes and weft tapes may be crossed perpendicularly or slantedly, or laminating two tape layers together, each of which has slantedly arranged tapes at predetermined distances from one to the other in the longitudinal direction of the tape layer, so that the tapes of each tape layer may be crossed perpendicularly or slantedly, thermally bonding the tape layers to each other under a pressure by providing at least one film layer of a polymer having a lower melting or softening temperature than that of the tapes between both layers as an adhesive binder, subjecting the resulting laminate to sufficient heat, thereby to melt the film at portions surrounded by crossed tapes, gather the molten film towards tape sides and form perforations for air permeation at portions surrounded by crossed tapes. And a composite laminate is prepared by bonding one layer composed of laminated product abovementioned, onto at least one surface of a layer composed of fibrous material. Cleavage and fluffing of the stretched tapes are suppressed by the gathered and solidified film of the polymer, and adhesion at the crossings of the warp and weft tapes is much intensified.

---

Figure 1:
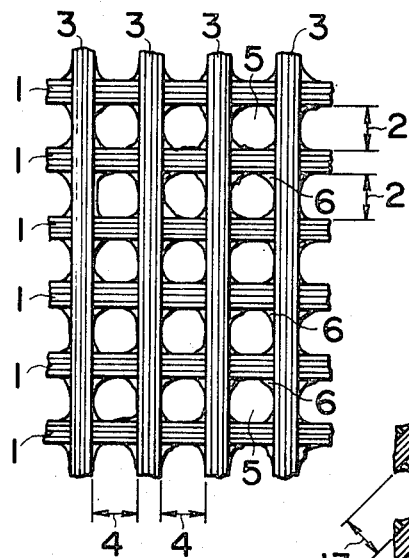

This invention relates to a laminate of warps and wefts of stretched tapes having perforations for air permeation, which comprises a large number of uniaxially stretched tapes of narrow width prepared from a fiber forming polymer being warped as raw materials at predetermined distances from one to another into layers of warp tapes and weft tapes and the warp tapes and weft tapes being laminated without weaving and thermally bonded to one another under a pressure in a state, where the warp and weft tapes are perpendicularly or slantedly crossed with one another, or both crossed tape layers are arranged slantedly in the longitudinal direction of the product, by providing at least one film of a polymer having a lower melting point than that of the tapes as an adhesive binder, the film of the polymer of the lower melting point being then melted at portions surrounded by the crossed tapes while the laminate is subjected to sufficient heat, thereby to gather the molten film towards the tapes and form perforations for air permeation at the portions surrounded by the tapes, cleavage and fluffing of the stretched tapes being suppressed by the gathered and solidified polymer and adhesion at the crossings of the warp and weft tapes being much intensified, and further the present invention relates to a process for preparing the same.

In many cases, the uniaxially stretched tapes of a fiber forming polymer have been used as a knitted or woven product by means of a knitting or weaving machine. Even in these cases, the tapes can have a higher strength, when the stretching ratio is increased, but when the stretching ratio is increased, the cleavage and fluffing often appear during the weaving step. That is, the higher stretching ratio has an unfavourable effect upon the tapes. Therefore, the stretching ratio is properly reduced. That is, even if the film can be stretched ten times as long as the original film, the stretching is often carried out at a reduced stretching ratio such as 5–6 times the original length to reduce a chance for the cleavage.

The present inventor disclosed in his another prior invention a process for producing a non-woven fabric by laminating warped layers prepared from stretched tapes as warps as well as wefts, using an adhesive film having a low softening point as an adhesive binder, and further proposed a method for giving an air permeation to the laminate, when the air permeability is required, by needle punching or strong embossing effect.

In the hitherto well known literature, there is an example of using an adhesive film in laminating threads as warps as well as wefts in a non-woven manner.

However, there is a remarkable difference in the adhesiveness at the crossed parts of the warps and wefts between cases of threads and stretched tapes. In the case of threads, especially spinning threads, the threads are twisted, and the cross-section of a bundle of single filaments is approximately round. It is impossible to unwind the threads, that is, impossible to handle the threads, so long as the threads are not twisted even in the case of filament yarns. Therefore, the threads are always twisted, even though a little, and several tens to several hundreds of single filaments are gathered round by twisting. Even in the case of non-twisted, pasted threads of filament yarns, the filament yarns are gathered round and bonded with an adhesive, and the threads composed of thin parallel single filaments are not commercially available.

When such threads are laminated as warps as well as wefts, the molten adhesive film has still a higher viscosity and fails to permeate through between the single filaments of the threads, and therefore the adhesion between the threads and the adhesive film is very weak, because the area of adhesion is restricted only to the outer peripheral surfaces of the threads.

On the other hand, in the case of the stretched tapes, even in the case of polyolefin tapes having a thickness of 0.02 mm., a width of 6 mm. and a fineness of about 1000 deniers, or 300–350 rectangular single filaments having a fineness of 3–4 deniers arranged in parallel and in a single layer without any clearances therebetween to a large width, their upper and lower surfaces serve as bonding surfaces for other material, and therefore their adhesion area are considerably larger than the round surface of a thread of 1000 deniers. This is a remarkable difference between the laminate of warps and wefts of stretched tapes and the laminate of warps and wefts of threads.

Similar disadvantage appears when a laminate of warps and wefts of thick monofilaments, that is, bristles, is prepared through an adhesive film as an intermediate layer.

Only when tapes of small thickness are used, the weight per unit area can be made smaller and the cost also can be made lower. That is, only the tapes of small thickness can serve as a raw material for a very practical laminate.

According to the present invention, tapes are warped at a predetermined distance from one tape to another at the warping, and thus warped tapes are crossed with another warped tapes. The thus obtained crossed tapes are laminated together with inserting at least one film having a lower melting point than that of the tape and the film is thermally bonded to the tapes. Then, the thus obtained laminate is subjected to sufficient heat thereby to melt the film having a lower melting point at portions surrounded by the crossed tapes, and is subjected to gathering towards the surrounding tapes. Consequently, even if tapes prepared by a higher stretching ratio are used, such disadvantages as easy occurrences of cleavage and fluffing can be prevented by the gathered and solidified polymer coating on the tapes. Furthermore, the adhesion at the crossing points of the upper tapes and the lower tapes is further intensified by the gathered polymer, and furthermore, a product having perforations of desired sizes for air permeation and water permeation, which can be used as a material for protecting agricultural products from animals, birds, or insects, or for fishing or as a curtain or other upholstery uses, can be obtained by properly changing the mutual distances between tapes. Furthermore, the product is suitable as a vegetable bag, for examples, bags for cabbages, lettuces, onions and tubers, and still furthermore, the present laminate product can be used also as bags for cereals and powders by making smaller the perforations for air permeation or placing a plain, fibrous layer between two layers of the present laminate and thermally bonding the layer to the laminate. These are the features of the present laminate product, which are considerably different from the prior art products. Particularly, in the case of the upholstery uses, sometimes the secondary processing, for example, embossing treatment for giving a knit or woven texture-like appearance, can be applied to the laminate product to improve its appearance.

Of course, in most cases, thin and narrow tapes having a width of 1–2 mm. are generally warped at a narrow distance when small perforations for air permeation are desired, and when the large perforations for the air permeation are desired, stretched tapes having a thickness of 0.05–0.1 mm. and a width of 5–15 mm. are warped at a wider distance. When the fibrous layer is placed between the two layers of the laminate, a laminate having larger perforations for air permeation is often used.

According to the present invention, uniaxially stretched tapes of a fiber forming polymer having a proper thickness and width are warped at the desired distance, according to the desired size of the perforations for air permeation and the desired strength of the laminate product, and a polymer film having a lower softening or melting point than that of the tapes is laminated onto the warped tapes with a slightly greater width than the lateral width of the warped tape layer and thermally bonded to the tapes, whereby a tape layer for wefts bonded with the polymer film is prepared in advance. For example, when the laminate product, in which warp tapes and weft tapes are crossed perpendicularly to each other, is to be prepared, tapes having a proper thickness and width are warped at a desired distance in a longitudinal direction separately, in the same manner as described above. In the course of moving the thus warped tapes, layers of said tapes for the wefts, which have been cut to a length corresponding to the width of the warped tapes, are placed one by one upon the warped tapes, which are arranged in the longitudinal direction, so that the tapes for the warps and the tapes for the wefts may be crossed perpendicularly to each other, that the adhesive film which is bonded to the weft in advance comes between them, and that the excessive edges of the adhesive films may be overlapped upon each other and the distance between the tape on the rear edge of the foregoing weft tape layer and the tape on the front edge of the succeeding layer may be almost equal to the distances between the warped tapes. The over-lapped tape layers are thermally bonded to each other under a pressure, and then the resulting laminate is introduced, for example, into a hot air heating chamber, where a hot air is blown against the laminate at a right angle thereto heat and melt the film of low melting point. At that time, the molten polymer is gathered towards the surrounding tape sides in such a form as to enclose the tapes. When such crossed tapes are cooled in the air, the adhesion at the crossing parts of the warps and wefts of the tapes is completely intensified with the gathered and solidified polymer having a low melting point. The tapes lying in other parts than the crossing parts of the tapes are also covered with the gathered polymer having a low melting point, and such disadvantages of the stretched tapes as the occurrences of cleavage and fluffing can be suppressed thereby. As a result that the film at portions surrounded by the tapes is molten and gathered towards the surrounding tape side, perforations for air passage, whose size corresponds to the distance between the tapes of warps or wefts, are formed at the spaces surrounded by the tapes. A laminate of perpendicularly crossed stretched tapes of warps and wefts, which has the desired air permeability, can be obtained, depending upon the sizes of the perforations. If there are pinholes on the adhesive film at the spaces surrounded by the crossed tapes, the melting starts, at first, at the pinholes. It is possible to prepare a laminate having latticework perforations with the desired width and the desired size of the perforations for air permeation. The laminate product having a desired broad width or a bag having a desired diameter can be prepared by providing the laminate with higher tape density at edges and sewing the said edges of the laminate or thermally bonding the edges under a pressure or simultaneously sewing and thermally bonding the edges.

The thus prepared laminate of crossed tapes of warps and wefts is characterized by a high dimensional stability in both warp and weft directions.

Now, the present invention will be explained in detail, referring to the drawings:

FIG. 1 shows a laminate product having approximately rectangular or square perforations for air permeation, which comprises uniaxially stretched tapes of narrow width being laminated upon one another in a state where warps and wefts are perpendicularly crossed at predetermined distances and being bonded to one another by inserted films of low melting point thereby to form a laminate, and the films being melted and gathered towards the surrounding tape sides while the laminate passes through a hot air zone, thereby to form approximately rectangular or square perforations for air permeation.

Figure 2:
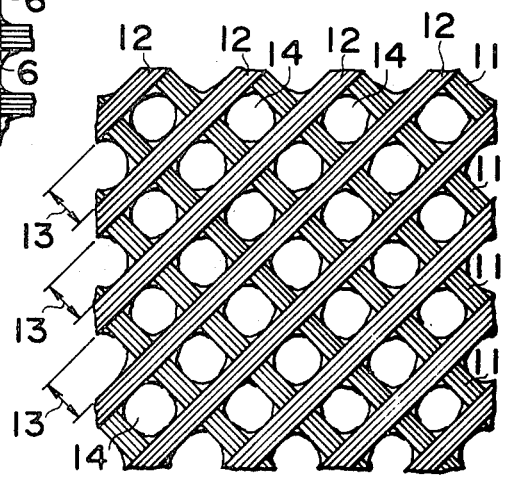

FIG. 2 shows a laminate product having perforations for air permeation, which comprises two groups of stretched tapes of narrow width, the tapes of which groups are arranged flat in parallel at predetermined distance to one another, crossed with one another and slantedly against a longitudinal direction of the laminate and thermally bonded to one another under a pressure by means of inserted films of low melting point thereby to form a laminate, the films being melted while the laminate is passed through the hot air zone, thereby to form perforations for air permeation, where the upper and lower tapes are crossed with one another and slantedly arranged against the longitudinal direction of the laminate product.

Figure 3:
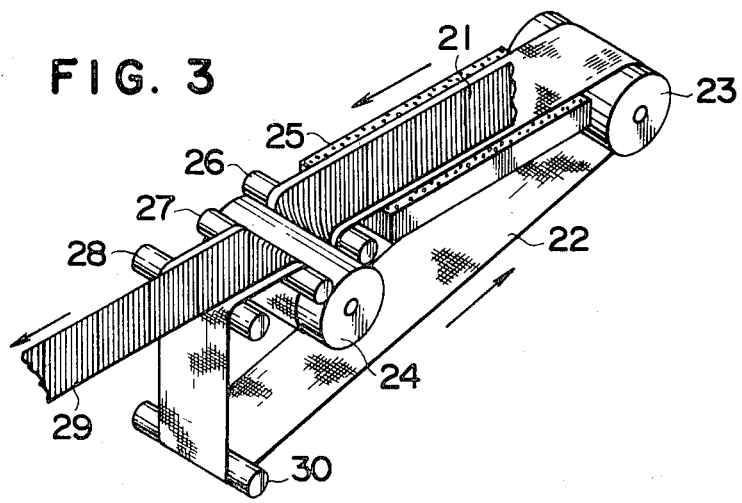

FIG. 3 is a view of an apparatus showing one step of the process for preparing the product of FIG. 2.

In FIG. 1, a laminate product of perpendicularly crossed tapes of warps and wefts in a lattice state against the longitudinal direction of the laminate product is shown. When a large number of tapes are warped, the tapes 1 for weft are warped and moved at predetermined mutual distances 2 apart, at first by passing the tapes through a comb. In this step, an adhesive film having a lower melting point and a little larger width than the width between both edges of the tape layer is placed upon the tape layer, and thermally bonded thereto under a pressure in a state where the adhesive film is heated to its softening point over a heating drum, whereby a laminate of tapes for weft is prepared at first. The resulting laminate is wound up tentatively. In a separate step, a large number of tapes are warped at predetermined distances 4 to the desired width in a longitudinal direction of the laminate product in the same manner as above, and are moved in a horizontal direction as tapes of warps. In this step, said laminate of tapes for wefts are cut to a length corresponding to the width of the layer of tapes of warps moving in a horizontal direction, and placed upon the layer of tapes of warps successively, so that both excessive edges of the adhesive film of the weft tape layer may be overlapped upon the corresponding excessive edges of the adhesive film of the adjacent weft tape layer and the tape distances at the edges may be almost equal to the other distances 2 of tapes. In most cases, the pressure is made negative below the warp tape layer, and the weft tape layer is made to fall upon the warp tape layer by suction. When the warp tape layer advances by its width, next cut weft tape layer is made to fall upon the warp tape layer by suction. According to this procedure, a laminate of tapes of warps and wefts having a uniform weft tape density, as shown in FIG. 1, can be prepared. If the adhesive film is provided between the warp tape layer and the weft tape layer at that time, a good adhesion of warp and weft tapes can be obtained in the successive thermal bonding step under a pressure. However, it will be explained, referring to FIG. 2, that the provision of the adhesive film only between the warp tape layer and the weft tape layer is not always an absolutely necessary condition.

Then, the thus prepared laminate is introduced into a heating zone. For example, tapes obtained by heat treating the stretched tapes of high density polyethylene has a heat resistance up to about 120° C. Thus, when a film of low density polyethylene, which can melt at about 110° to 115° C., or a film of copolymer of vinyl acetate and ethylene is used as the adhesive film, and a hot air is blown against the surface of the laminate at a right angle thereto in the hot air chamber at 120° C., the film between the tape layers is softened and melted, and gathered towards the surrounding tape sides. As a result, perforations 5 for air permeation are formed at spaces surrounded by the warp tapes and the weft tapes. The size of the perforations for air permeation becomes almost equal to the size of spaces surrounded by the warp tapes and weft tapes. When the heating is effected insufficiently, unmelted film parts 6 sometimes remain at the tape sides. In that case, the unmelted film parts remain in the form of web-feet of water fowls at the crossed parts of the warp tapes and weft tapes.

Now, explanation will be made, hereunder, as to a process for preparing a laminate product, where tapes are slantedly crossed with one another against the longitudinal direction of the laminate product, especially among the laminates of crossed stretched tapes having perforations for air permeation.

In FIGS. 2 and 3, a laminate product having diamond perforations 14 for air permeation, wherein lower tapes 11 and upper tapes 12 are slantedly crossed against the longitudinal direction of the laminate product and laminated with one another in a diamond state, and a process for preparing the same are shown. Various processes for preparing such a laminate product are available, but according to one of the processes, a large number of tapes are warped in parallel at predetermined distances 13, and an adhesive film having a little larger width than the width of the thus prepared tape layer is placed upon one surface of the tape layer, leaving portions of the adhesive film, which have widths corresponding to the distance between the tapes at both edge parts of the tape layer. Then, the tapes and the adhesive film are thermally bonded to each other under pressure to prepare a laminate product. The thus prepared laminate product is cut at a predetermined inclined angle against the longitudinal direction of the tapes, for example, at an angle of 45°, to prepare a diamond laminate 21. A porous cloth belt 22, as shown in FIG. 3, is circulated around a driving roller 23 and a heating roller 24. A negative pressure chamber 25 is provided below the upper side belt in its running direction. Said diamond laminate is held, for example, on a suction plate, which is not shown in the accompanying drawings, and brought upon the belt 22, and adjusted so that the tapes of the diamond laminate may be oriented at 45° against the running direction of the belt. The diamond laminate is made to fall upon the belt by suction due to the negative pressure generated below the down side of the belt. Excessive portions of the adhesive film at both edge parts of the diamond laminate in the running direction of the belt are overlapped with the excessive portions of the adjacent falling laminate at both edge parts on the running belt, and the tape distances at both edge parts are made almost equal to other distances 13 between the tapes. The thus arranged tapes and adhesive film are led over to the heating roller 24 through a turn roller 26, and the portions of the adhesive films, which are overlapped with one another at both edge parts of the tape layers, are brought into between the belt and heating roller and heated and thermally bonded to each other under a pressure by a pressure-bonding roller 27. Then, the belt is circulated through guide rollers 28 and 30 in the return course, and the continuous laminate 29 is cooled, then separated from the belt over the guide rollers and transferred to the next step. The tapes of continued diamond laminates 29 are inclined at an angle of 45° in the longitudinal direction of the continuous layer 29. Two sheets of said laminates 29 are placed upon one another in another step so that the resulting tapes of two upper and lower layers are crossed with each other. The both groups of the tapes have inclinations of 45° against the longitudinal direction of the laminate product. Such laminate is thermally bonded under a pressure and led to a hot air chamber, where the adhesive film is melted by the hot air blown at a right angle against the laminate product. A laminate product having diamond perforations for air permeation, wherein the stretched tapes are crossed with each other, as shown in FIG. 2, can be obtained. In that case, the resulting laminate product consists of two adhesive film layers and two tape layers. Whenever at least one adhesive film layer is arranged between two tape layers and laminated, the mutual adhesion at the crossings of taps can be improved. When more adhesive layers are used, for example, in the case of such a combination as an adhesive layer plus a slanted tape layer plus an adversely slanted tape layer plus an adhesive layer, a practical laminate product can be obtained. The thus prepared laminate product having diamond perforations for air permeation, where the tapes are crossed with each other and arranged slantedly in the longitudinal direction of the product, has a reticular property. That is, the laminate product can be freely stretched or shrinked to some degree in both the longitudinal and lateral directions thereof. This is an advantage of the laminate product having the diamond perforations. Of course, it is often necessary to reinforce the edge parts or the longitudinal direction of the laminate product by placing another stretched tapes having some width at both edge parts of the laminate or providing a warped tape layer throughout the entire width of the laminate product.

The present laminate product can be formed or processed at a high speed without any weaving step. Therefore, the present product is advantageous in low cost, light weight, easy handling and good durability.

By properly selecting the tape distances and consequently the sizes of perforations for air permeation, the present product can be used as a net for drying purple laver. That is to say, the present product never undergoes rusting or corrosion as encountered in the case of metal wire mesh, when used as the net materials. When it is necessary to give the present product a resistance to ultraviolet ray, it is possible to mix the polymer used with a UV-stabilizer. Particularly, it is well known that the tapes of polyacrylonitrile group has a very good resistance to weathering.

A product having fine perforations for air permeation, for example, the width of tape and distance between the tapes being 1–2 mm., can be used as a bag for very fine solid, a net for preventing insects, and a bag for cereals. Anyway, the uniaxially stretched tapes used in the present invention are those prepared by stretching a non-stretched film of a fiber forming polymer about 6 to 10 times the original length in the longitudinal direction, and therefore has an increased strength in the longitudinal direction according to the stretching ratio and has an improved dimensional stability, resistance to coldness and flexibility. Even if about 50–200% by weight of the polymer film having a low melting point is used as an adhesive binder, based on the weight of the stretched tapes, a laminate product having a practical strength can be obtained at a sufficiently low cost. Sometimes, it is possible to add a plasticizer having no influence upon the strength of the tapes to the adhesive polymer, and a large flexibility can be endowed to the laminate product even in winter.

In the case of stretched tapes of high density polyethylene, a large number of polymer films having a low melting point, for example, a polymer film of low density polyethylene having a low degree of polymerization, a copolymer film of ethylene and vinyl acetate, a copolymer film of ethylene and acrylamide, etc. can be used as the adhesive polymer film having a low melting point. When a large amount of the polymer film, for example, 100 to 300% by weight of the polymer film, is used as the adhesive binder on the basis of the weight of the stretched tapes according to the present invention, the tapes are almost enclosed with the molten polymer, and therefore a polyvinyl chloride film containing a plasticizer can be used as the adhesive polymer film for the stretched tapes of polyethylene.

In the case of the stretched tapes of polypropylene, a low melting point film containing noncrystalline polypropylene, a copolymer film of ethylene and propylene, a polyvinyl chloride film containing a plasticizer, or the like can be properly used.

The structure of a laminate product of crossed stretched tapes having perforations for air permeation of the present invention includes (1) such a three-layer structure as a warp tape layer plus an adhesive film plus a weft tape layer, (2) such a four-layer structure as a warp tape layer plus an adhesive film plus a weft tape layer plus an adhesive film where the adhesive film has been provided at one side of the warp and weft tape layers, respectively, (3) such a five-layer structure as an adhesive film plus a warp tape layer plus an adhesive film plus a weft tape layer plus an adhesive film, and other modifications of these structures. According to said structures (1) and (2), a ratio of the amount of the tapes to that of the adhesive film often depends upon the thickness of the adhesive film, thickness and width of the stretched tapes, etc. When the distances between the tapes are broad, a product prepared by laminating a plurality of the laminate products as shown in FIG. 1 or 2 together, where the strength of the product is intensified in both longitudinal and lateral directions as well as slanted directions, can be taken into consideration within the scope of the present invention.

To color the laminate product, a pigment is usually mixed with the adhesive film layer and the colored adhesive film layer is used in most cases. It is preferable that no pigment is mixed with the tapes, and no colored tapes are used, because compounding of a pigment causes to lower the stretching ratio of the tapes.

As the heating for forming perforations for air permeation on the continuous laminate of the tape layers and the adhesive film, a hot air chamber is usually used, where hot air is blown against the laminate at a right angle thereto to melt the film. At that time, the molten polymer is gathered naturally towards the tape sides by its surface tension, while the laminate is passed through the chamber. Therefore, such a procedure is widely employed in most cases. A hot air having a higher temperature than the heat-resisting temperature of the stretched tape can be used, because the heat is at first absorbed by the melting of the film having a low melting point in the laminate, and the molecular arrangement of the stretched tapes is never released or shrinkage of the tapes is never brought about, so long as the heating is carried out for a short time. Thus, the melting of the film having a low melting point can be carried out. However, the heating to a higher temperature than the heat-resisting temperature of the stretched tapes for a prolonged period of time must be absolutely avoided. Of course, the heat-resisting property of the stretched tapes can be improved, if the stretched tapes are subjected to a relaxing heat treatment at a proper temperature of the stretched film of the polymer, which allows the tapes to be shrinked by about 20%. If the shrinkage of the laminate in the lateral direction is prevented by pinching both side edges of the laminate with tenter-frame, and the roller speeds at the inlet and outlet of the laminate are made equal, the film with tapes without relaxing heat treatment can be prevented from shrinkage in both the longitudinal and lateral directions.

As the heating means, a radiation heating can be applied. When the heating is carried out by making the laminate travelled over heating drums one by one, it is better to coat the drum surfaces with a florine containing resin. The procedure using heating drums is applied to preheating in most cases, because that has such a disadvantage that the molten polymer is liable to be attached and retained on the drum surfaces if the laminate has perforations of large sizes. In brief, said various heating means are used alone or in a proper combination in the heating zone.

As for the elongated stretched tapes applicable in the present invention, the following point must be taken into consideration: When the stretched tapes, each being wound on a bobbin, are used as a raw material for warping, as in the conventional tapes of various thermoplastic polymer available from market, the tapes are liable to be in a flexed or bent state, falsely twisted state or in a state of uneven distribution of tension at the warping, and therefore, a better adhesion of the tapes with the adhesive film cannot be attained in most cases.

In the prior patent application, the present inventor proposed at method for preparing a uniaxially stretched film of large width in a high stretching ratio from a non-stretched film of large width in a multi-stage stretching process, and winding the film on a roll continuously up to a large diameter. The stretched film obtained according to said method of the prior invention is slittted into numbers of parallel tapes of desired small widths, and a large number of the thus prepared tapes, which are arranged in parallel, are plainly wound, or the film is longitudinally slitted to the desired small widths just before the warping and sectionally warped to a tape layer, and the resulting tape layers are finally warped to the desired widths, at predetermined tape distances, from several sectionally warped tape layers. According to said method, all the tapes can be arranged in a flat state, and complete adhesion of the tapes with the adhesive film can be carried out. Thus, said method is most preferably applicable to the present invention.

The present laminate product of crossed stretched tapes having perforations for air permeation has a following application in which an object to effect a thorough thermal insulation, as well as the following object are attained. That is to say, a flat entangled layer of long or short fibers, for example, a web of reclaimed short fibers prepared by a garnet machine, or a carded web of the short fibers containing new short fibers, or a flat layer of crimped filaments, or a layer of warp and weft threads, is inserted between the two upper and lower layers of the laminates having larger perforations for air permeation. Even if the perforations for air permeation are larger between the tapes, the layer of fibers inserted between the upper and lower layers of the laminates makes the sizes of the perforations for air permeation smaller by thermal bonding and fixation of the layer of fibers with an adhesive polymer film having been attached to the tapes, notwithstanding the perforation of the upper and lower laminates are larger. When the thus prepared laminated product is used as a bag for cereals, no falling out of small grains from the bag occurs. Furthermore, sampling of cereals from the bag can be readily carried out. When the layer of fibers is thicker, sometimes the adhesion of the layer of fibers cannot be effected to the entire thickness with the adhesive polymer only on the tapes of the laminates of crossed stretched tapes having larger perforations as two upper and lower surface layers. When it is necessary to use such a thick layer of fibers, the fibers are immersed in an adhesive binder solution and dried, or quilted to prevent a mutual slippage of the layer of fibers bonded to the upper and lower surface layers, respectively. The case where such a thick layer of fibers is inserted between the upper and lower layers of the laminates is usually rare. When the front and back surfaces of the layer of fibers are covered with laminates of crossed stretched tapes having larger perforations for air permation, for example, squares having side lengths of 2 to 10 cm., a portion of fibers is always thermally bonded to each other under a pressure with the adhesive polymer on the tapes, and hence there is no danger for the disengagement of the fibers, even though there takes place fluffing. The strength of the laminate product is intensified by the insertion of the layer of fibers, and its dimensional stability is maintained by the warp and weft tapes.

A product prepared by placing said layer of fibers upon one side of the present laminate product of crossed stretched tapes having perforations for air permeation, thermally bonding the fibers to the tapes, pasting the fibers with an adhesive binder for fibers and drying the fibers, can be used as a thermal insulator material. Particularly, in that case, said layer of fibers is placed upon a laminate of tapes having small widths, for example, 1–2 mm., and perforations having squares of side lengths 5 to 10 mm., and the fibers are thermally bonded to tapes under a pressure. Then, an emulsion binder is applied to the fibers and dried.

Or, the conventional, commercially available, nonwoven fabric of short fibers is laminated with the present laminate product, and the tapes are thermally bonded to the fibers. The resulting product is given a higher dimensional stability by the tapes, and its strength is intensified. The thus obtained product is used as a non-woven fabric material and can overcome the disadvantages of the conventional non-woven fabric of short fibers, when used as a carpet packing or thermal insulator material.

EXAMPLE 1

A tubular film of high density polyethylene having a thickness of 0.075 mm. and a diameter of 500 mm. was taken up through pinch rollers vertically downwards at a speed of 20 m./min. and a folded width of 750 mm. according to a downward water quenching method, and cut away at both ends of the folded film at the outlet side. Again the films were taken up through pinch rollers 6 m. above the floor and passed through a wave-form, curved slit having an entire slit length of 800 mm. and an apparent width of 380 mm., positioned at a level 2 m. below the pinch rollers. Just after the passage through the slit, hot water at 95° C. was ejected to both sides of the films and stretched to 4 times the original length, whereby two primarily stretched films piled upon another and having a width of 375 mm. were prepared. The thus prepared double films were passed through pinch rollers at a level near the floor, and then the two films having a width of 375 mm. were arranged side by side into parallel state, by means of shift bars. Then, the films were passed through a drier drum covered with cloth at 100° C. and water attached to the surfaces of the films was dried. The films were then led to a hot air chamber provided at a location 1.5 m. distant from the drum through a wave form, curved slit having an apparent width of 500 mm. at its inlet side. Hot air at 125° C. was blown against the both sides of the films arranged in parallel and the films were secondarily stretched to 2.25 times the length of the primarily stretched films. That is, the films were stretched in total 9 times the original length. Heat-setting was carried out for 1.5 seconds while the films were moved over hot rollers one to another maintained at the surface temperature of 122° C. provided in the hot air chamber. These two films having a width of 250 mm. were arranged in parallel and split fiber yarns having 1,000 deniers were inserted between successive two wound layers of the films in a zigzag manner, while traversing split fiber yarns beyond the width of the film and making the yarns in an arc shape at both the edge parts of the films to protect the edges of the films. By applying a weak tension to the films by a torque motor, the unevenness in thickness of the films was absorbed by clearances between the respective layers of wound layer and the films of a length of 5000 m. were wound into a cylindrical form of about 500 mm. width at a speed of 180 m./min.

In the course of unwinding said stretched films having a large width, the split fiber yarns were wound up separately, and irregular pressed patterns on the surface of the films arranged in parallel were removed by subjecting the film to a tension in a hot air chamber. The film was slitted into flat tape layer consisting of 100 tapes, each having a width of 5 mm., by means of a slitter provided with thin knives in parallel, and passed through a comb, whereby the distance between tapes was made to 13 mm., that is, there was made present a tape having a width of 5 mm. at each interval of 18 mm. A film of low density polyethylene having a low melting point, and a thickness of 0.022 mm. and a width of 1,830 mm., which was prepared separately, was placed upon the warped tape layer so that the film might have excess portions having a width of 15 mm. at both edge parts of the tape layer, and thermally bonded to the tape layer at 108° C. under a pressure, whereby a tape layer for weft having a width of 1,820 mm. was prepared. The strength and the elongation of the stretched tapes were 5.5 g./d. and 15%, respectively.

While another tape layer consisting of 100 tapes prepared as above, each having a width of 5 mm., were warped and run at a lateral width of 1,800 mm., as a tape layer for warp, the end of the tape layer for weft was drawn out with a gripper from the lateral side of the warp tape layer and made to travel horizontally across over the tape layer for warp, and cut at each width of the tape layer for warp by means of a melt cutter. The cut tape layer was made to fall successively upon the tape layer for warp by suction due to the negative pressure exerted from the down side of the tape layer for warp, so that the adhesive film might be inserted between the tape layer for warp and the tape layer for weft. At that time, the 10 mm. wide excess portion of the films at both edge parts of the tape layer for weft were made to be overlapped with that of the adjacent films so that the tape distance at the overlapped parts of the tape layer for weft might be 13 mm. The travelling speed of the tape layer for warp was 54 m./min., and the tape layer for weft was cut and made to fall 30 times per minute. A laminate of warp and weft tapes was obtained at about 97 m.²/min. The laminate was passed through between heating rollers for thermally bonding the film to the tape layer of warp and weft under a pressure. Then, the laminate was led to a hot air chamber provided with tenter frame having a width of 1.8 m., and both edges of the laminate were pinched by the tenters to suppress the tapes from shrinkage in the lateral direction. The surface speeds of the front and back rollers were made equal in the longitudinal direction, and longitudinal shrinkage of the tapes was prevented thereby in the hot air chamber. At that time, hot air at 120° C. was blown against one side of the laminate from a slit, and the temperature of the hot air chamber was kept at 110 to 115° C. The portions of the film surrounded by the warp tapes and weft tapes were melted and gathered towards the tape sides. The laminate was cooled in the air, whereby a laminate product of crossed tapes of warps and wefts having a smooth surface and latticework perforations for air permeation in squares of side lengths of about 12 to 13 mm. was obtained. Its strength was 330 to 350 kg. per 1 m. width in both lateral and longitudinal directions, and the basic weight of tapes was 12 g./m.² in total of the warps and wefts, and that of the adhesive film was 20 g./m.².

Alternatively, by applying the film of low density polyethylene compounded with various coloring pigments, the laminate product could be desirably colored.

EXAMPLE 2

The tape layer for weft with bonded adhesion film having a width of 1.82 m. prepared in the same manner as in Example 1 was cut to a diamond form at 45° against the oriented direction of the tapes, and the tape layer having a side length of 1.82 m.×√2=2.575 m. was placed upon a circulating belt of FIG. 3, so that the weft tape layer might be inclined at 45° C. against the travelling direction of the belt, the portions consisting only of the adhesive film at both edge parts of the cut tape layer for weft might be overlapped with the adjacent film portions of the cut tape layer which was placed successively upon the belt, and the distance between the tapes at both edge parts might be almost equal to other distance of the tapes. By advancing the tape layers together with the belt, the overlapped portions of the adhesive film was heated and bonded to each other under a pressure to make the tape layers into a continuous one. In this manner, a primary continuous layer having a width of 1.8 m., where tapes were inclined at 45° against the longitudinal direction of the layer, was obtained.

Then, these two primary continuous layers were placed upon each other, so that the tapes of the one layer might be crossed to those of the other, and the respective adhesive films of these two layers might be inserted between the crossed tape layers, and were bonded to each other under a pressure between hot rollers. The thus obtained laminate was led to a hot air chamber, where the adhesive film was heated and melted in the same manner as in Example 1, and the molten film gathered to the surrounding tape sides. In this manner, a laminate of slantedly crossed tapes having perforations for air permeation was obtained.

The laminate product of slantedly crossed tapes obtained in this example can have a larger stretchability in the lateral direction, if the tapes are more inclined towards the longitudinal direction of the laminate product. When the two primary continuous layers are placed upon one another, and another stretched tape having a proper width are inserted only between both edge parts of the layers and bonded to the layers, these two edge parts are reinforced, and the resulting laminate can be conveniently sewn.

EXAMPLE 3

In preparing a laminate of perpendicularly crossed stretched tapes of warps and wefts, a film having a thickness of 0.21 mm. and a folded width of 660 mm. obtained according to a method for water quenching a tubular film was stretched in two stages to 9 times the original length in the same manner and apparatus as used in Example 1, and the resulting two stretched films having a thickness of 0.07 mm. and width of 220 mm. were slit into tapes of 10 mm. width, whereby 44 stretched tapes were obtained. The 41 tapes thus obtained were warped at distances of about 40 mm. between the tapes to a width of 2 m., and two films of low density polyethylene containing a brown pigment, each having a width of 1040 mm. and a thickness of 0.04 mm. were arranged in parallel in a flat state and placed upon the tape layer having a width of 2 m. so that the films might be extended at both edge parts of the tape layer by 30 to 35 mm. and overlapped at the center by 10 to 15 mm., and the films were thermally bonded to the tape layer under a pressure, whereby a tape layer with bonded film for weft was prepared.

While another tape layer consisting of 41 tapes were warped at a pitch of 50 mm. to a width of 2 m. and travelled as a warp in the similar manner but without bonding, said tape layer for weft was cut in accordance with the width of the running warp layer and dropped on the running warp layer 30 times per minute, so that the warp tapes and weft tapes might be crossed with each other almost at a right angle, the adhesive film might come between the two layers, both edge parts of the weft tape layer might be overlapped with those of the adjacent weft tape layer, and the tape distances at these two edge parts might be made almost equal to the distances between other tapes. Furthermore, each of tapes having a width of 10 mm., which was in excess when the warp and weft tape layers were prepared, was placed upon the tape at each of both edges of the warp tape layer to reinforce the edge parts of the warp tape layer. The warp and weft tape layers were passed through heating rollers thereby to fix the layers of the adhesive films inserted between the layers along the entire surface of the layers and form a laminate. Then, the laminate was led to a hot air chamber, where the adhesive films were melted, and gathered towards the surrounding tape sides. The molten films were then solidified, whereby a laminate product having relatively larger perforations was obtained. Upon the laminate product of perpendicularly crossed tapes of warps and wefts having the perforations for air permeation, a web of carded jute was placed at a ratio of 100 g./m.², and furthermore, a laminate product of perpendicularly crossed tapes of warps and wefts, each tape having a width of 10 mm. and the tapes being arranged at distances of 40 mm., which was prepared according to said procedure, was placed upon the web, so that each tape of the upper and lower layers might be placed right upon one another and the web of fibers might be sandwiched by these two layers. The web of fibers was thermally bonded to the upper and lower tapes under a pressure at 110° to 115° C. between a heating roller having small grooves in the width direction of the roller and a rubber roller. At that time, the polymer having a low melting point on the tapes was permeated into the web of fibers at the periphery of the tape layers, but a laminate product having square perforations for air permeation of side lengths of about 35 mm. at locations where only a web of the fibers was present was obtained.

In the case of only two laminates of stretched tapes, which were placed upon one another in Example 3, had a strength of 60 to 65 kg./width of 5 cm., which was sufficiently over the strength required by the standard of a bag for rice or wheat (50 kg./width of 5 cm.). Thus, the merits obtained by using the web of jute at that time are mentioned as follows: small grains such as those of rice and wheat can be prevented from falling outwards, while keeping the air permeability of the bag; even if a sampling tube is pushed into the content cereals through between the fibers and taken out for inspection of the content, the fibers can be readily returned to the original state and the falling out of the content can be effectively prevented. Of course, the provision of the web of fibers between the tape layers can effectively reinforce the laminate product.

Of course, it is advantageous for the incorruptibility and durability to use a web of synthetic fibers in place of the web of natural fibers. Furthermore, it is possible to lower the cost of the web of fibers by using or mixing the reclaimed fibers prepared by a garnet machine.

Of course, it is possible to use threads in parallel as warps and wefts in place of the web, and further it is possible to provide a non-woven fabric of short fibers between the tape layers.

When the layer of fibers provided between the tape layers in this example is too thick, it is impossible to prevent the slippage of the upper and lower tape layers only with an adhesive film attached to the tapes. In such a case, quilting must be applied thereto.

In the foregoing Examples 1, 2 and 3, a low density polyethylene film having a low melting point was used together with the stretched tapes of high density polyethylene, but as in the case of Example 3, it is very desirable to use a film of copolymer of ethylene and vinyl acetate having a good adhesiveness to obtain better adhesion with the fibers.

When the web of fibers is inserted between the tape layers, easy occurrence of fluffing is a disadvantage, and in that case, the product of Example 3 is immersed in an adhesive binder solution, squeezed and dried, whereby the fluffing can be prevented.

As the stretched tapes utilizable in the present invention, such stretched tapes of fiber forming polymer as those of polyolefins, vinylic homopolymer or copolymer of polyvinyl chloride, polyvinyl alcohol, polyacrylonitrile, polyvinylidene chloride, etc., and nylon, polyester and regenerated cellulose can be used. As the film to be placed thereupon, a polymer film having an affinity towards the stretched tapes and a good adhesiveness to other fibers, if required, is used. Sometimes, adhesion with the stretched tapes or fibers is improved by applying a special treatment or primer treatment to the surface of the present laminate product.

What is claimed is:

1. A laminate, which comprises a layer of numbers of warped stretched tapes of narrow width, prepared from a fiber forming polymer, arranged flat in parallel to each other at predetermined distances and bonded to another layer of numbers of warped stretched tape of narrow width prepared from the same polymer as above, arranged in parallel to each other at predetermined distances crosswise, with a polymer film having a lower melting point than that of the tapes, leaving perforations at the portions surrounded by the crossed tapes having thickly gathered film polymer on the periphery thereof.

2. A composite laminate, which comprises a layer composed of a web of fibrous material and one crossed tape layer which is composed of a layer of numbers of warped stretched tapes of a fiber forming polymer and arranged flat in parallel to each other at predetermined distances bonded crosswise to another layer of the same composition and construction as above-mentioned, with a polymer film layer having a lower melting point than that of the tapes, leaving perforations at the portions surrounded by the crossed tapes with the thickly gathered polymer film on the periphery thereof, bonded to at least one surface of the web with the infiltrated thickly gathered polymer film into the web nearby the crossed tapes.

3. A method for preparing a cross laminate comprising a layer of numbers of warped elongated stretched tapes of narrow width, prepared from a fiber forming polymer, arranged flat in parallel to each other at predetermined distances and bonded crosswise to another layer of numbers of warped elongated stretched tapes of narrow width prepared from the said polymer and arranged flat in parallel to each other at predetermined distances with a polymer film layer, having a lower melting or softening point than that of the tapes, and having perforations for air permeation, which is characterized in subjecting the cross laminate of the two layers of the warped stretched tapes bonded together with the polymer film, having a lower melting point than that of the tapes, to sufficient heat thereby to melt the film at portions surrounded by the crossed tapes, gather the molten parts of the film towards the tape sides, covering the tape, form perforations for air permeation at portions surrounded by the crossed tapes and at the same time securing firm bonding at the crossing parts of the tapes and removal of cleavage and fluffing of the tapes, between the crossings.

References Cited
UNITED STATES PATENTS

| | | | |
|---|---|---|---|
| 1,978,620 | 10/1934 | Brewster | 156—253 X |
| 3,012,918 | 12/1961 | Schaar | 161—112 |
| 3,147,820 | 9/1964 | Finger | 161—112 X |
| 3,255,065 | 6/1966 | Wyckoff | 161—112 X |
| 3,546,327 | 12/1970 | Ruda | 156—252 X |

WILLIAM A. POWELL, Primary Examiner

U.S. Cl. X.R.

156—177, 178, 253; 161—58, 112; 264—154, 257, 291